July 23, 1963 H. R. ANDERSON, JR 3,098,808
PROMOTION OF HIGH ENERGY RADIATION EFFECTS
IN POLYMERIC MATERIALS
Filed April 14, 1958

INVENTOR.
H. R. ANDERSON, JR.

BY Hudson & Young

ATTORNEYS

United States Patent Office 3,098,808
Patented July 23, 1963

3,098,808
PROMOTION OF HIGH ENERGY RADIATION EFFECTS IN POLYMERIC MATERIALS
Herbert R. Anderson, Jr., Bartlesville, Okla., assignor to Phillips Petroleum Company, a corporation of Delaware
Filed Apr. 14, 1958, Ser. No. 728,246
33 Claims. (Cl. 204—162)

This is a continuation-in-part application of my co-pending application, Serial No. 655,474, filed April 29, 1957, now abandoned.

This invention relates to a method of promoting the effects of high energy radiation in polymeric materials. In another aspect it relates to a method of increasing the effects of radiation by alpha, beta, gamma or X rays upon long chain polymers, either natural or synthetic, by associating therewith a promoting material. In one of its more specific aspects this invention relates to a method of vulcanizing various elastomeric materials by exposure to high energy radiation after incorporating therewith a promoting agent. In another of its more specific aspects my invention relates to an improved method and apparatus for continuously forming a cross-linked polymeric structure, such as a sheet or strand.

High energy radiation such as alpha rays, beta rays, gamma rays, or X rays are capable of producing modifying effects on long chain polymers, either natural or synthetic. Certain of these polymers, for example, natural rubber and various types of synthetic rubbers and nonrigid plastics, can be cross-linked by exposure to such high energy radiation, particularly gamma radiation. Other types of long chain polymers, for example, butyl rubber, polymethyl methacrylate, and the like, tend to undergo softening or chain cleavage when exposed to radiation of this type. Apparently in many polymers both cross-linking and cleavage occur, with one or the other predominating. Methods of increasing these effects with neutron radiation have been advanced but these carry the disadvantage of imparting radioactivity to many materials so treated.

I have now found a method of enhancing the effects which high energy radiation of the type above described has upon long-chain polymers. By the practice of my invention any desired amount of cross-linking or chain cleavage, as the case may be, can be obtained in a neutron-free field with considerably lower radiation dosage than is otherwise necessary. I have found that by incorporating a heavy metal having an atomic number of at least 40 into the polymeric material, radiation by alpha rays, beta rays, gamma rays or X rays can be attenuated and the effects of such radiation on the polymeric material enhanced. The metal can be incorporated into the polymeric material either in its free state or as an alloy or compound, such as inorganic compounds, organic salts, or organometals. Also, benefits can be realized by encasing films or sheets of polymeric material between thin plates of metal so that firm contact is maintained between surfaces during irradiation. In this aspect molded polymeric structures can be continuously cross-linked by irradiation by passing the polymer through a forming device in which the polymer comes into contact with a surface of heavy metal exposed to a radiation source. My invention is particularly useful in the production of cross-linking in certain elastomers and nonrigid resinous polymers which have the property of becoming cross-linked when subjected to high energy radiation.

As an additional aspect of my invention, I have discovered that the effects of high energy radiation can be promoted by incorporating into the polymeric material prior to irradiation a metal salt of a saturated or unsaturated aliphatic acid having from 8 to 30 or more carbon atoms per molecule. When employing organic salts of this type, it is not essential that the metal have an atomic number of at least 40. I have also found that the radiation effects upon long chain polymers, such as natural and synthetic rubber, can be promoted even further by using, as the promoting agent, organometals in which the metal component has an atomic number of at least 30 and preferably 40 or above. The application of this embodiment for the enhancement of cross-linking in elastomers is particularly useful as the required radiation dosage is greatly reduced. It is believed that with the organometal promoting agent a dual effect is realized combining the radiation attenuation of the heavy metal with free-radical formation of the organo constituent, thereby producing even greater cross-linking with any given amount of radiation. So pronounced is this benefit that marked improvement is evident with metals in the 30 to 39 atomic number range which are ineffective when used alone or as salts other than the above-described salts of aliphatic acids. When using the organometal above described, any high energy radiation of the type selected from alpha rays, beta rays, gamma rays and X rays will produce cross-linking in these polymers with promoted results. In this aspect it is also possible to enhance the secondary radiation effects of fast neutrons for applications in which the residual radioactivity thereby imparted can be tolerated. Thus it is possible with my invention to produce a much larger volume of vulcanizate in a given time than can be prepared in the absence of the promoters described.

It is an object of my invention to provide an improved method of modifying long chain polymers, either natural or synthetic, by subjecting them to high energy radiation in the presence of a promoting material.

It is another object of my invention to provide a method of modifying long chain polymers with lower radiation dosages.

It is a still further object of my invention to provide a method for producing a higher degree of cross-linking in certain elastomeric and resinous polymers with a given amount of neutron-free high energy radiation.

Another object of my invention is to provide a method of employing a filler in certain elastomers which will enhance the degree of vulcanization which can be produced by high energy ionizing radiation.

Still another object is to provide a method and apparatus by which a polymeric structure can be continuously formed and cross-linked by irradiation.

Other objects, advantages, and features of my invention will be apparent to those skilled in the art from the following discussion, examples, and drawing in which.

High energy radiation by alpha rays, beta rays, gamma rays or X rays, particularly gamma radiation, produces a variety of effects upon long chain polymeric materials. My invention is especially useful for vlucanizing various elastomers and resinous materials in which the net effect of high energy radiation is cross-linking. Vulcanization of elastomers in this manner has numerous advantages. It is effected in the absence of sulfur and various curatives such as vulcanization accelerators, accelerator activators, and the like, thereby greatly reducing or eliminating difficulties with post vulcanization. Aging properties of rubber which has been vulcanized in the absence of sulfur are, therefore, improved. Vulcanization by irradiation is a relatively simple procedure since no curatives are needed and no heating is required. Thick sections of rubber can be vulcanized uniformly by exposing the rubber to ionizing radiation. Also various resinous polymers become cross-linked when treated in this manner. In general this applies to olefinic plastics such as polyethylene, polystyrene, nylon, polyvinyl acetate and polyvinyl alcohol. Various silicone polymers likewise behave in this manner. Most elastomers, either natural or synthetic, fall into this category, but one notable exception is butyl rubber which is softened by chain cleavage when exposed to high energy radiation.

Although the production of chain cleavage by irradiation is generally not as desirable as the production of cross-linkage or vulcanization, the possibilities of such a process are many. For example, when polymethylmethacrylate is subjected to high energy radiation, the polymer is softened with the evolution of hydrogen, producing a solid foam useful as insulating material. Such a process could be used to produce insulation in situ. Chain cleavage by radiation can be utilized to transform high molecular weight polymers to soft waxes and similar products. Examples of polymeric materials in which chain cleavage exceeds cross-linking as a result of high energy radiation are polyisobutylene, polymethyl methacrylate, polytetrachloroethylene, and vinyl chloride-vinyl acetate polymer. When it is desired to increase the amount of cleavage or softening of such polymers, my invention can be advantageously employed to reduce the required amount of radiation.

A preferred application of my invention because of its greater utility and possibilities through the use of various fillers and reinforcing agents which also enhance vulcanization is the treatment of natural rubber and synthetic elastomers such as are prepared by the polymerization of conjugated dienes having from 4 to 8 carbon atoms per molecule, or copolymerization of mixtures of conjugated dienes, or copolymerization of a major amount of a conjugated diene with a minor amount of copolymerizable monomer containing $CH_2=C<$ group. Examples of such synthetic elastomers are butadiene-styrene copolymers, butadiene-acrylonitrile copolymer, polybutadiene, polyisoprene, polychloroprene and various vulcanizable solid or semi-solid isoolefin-conjugated diene copolymers which have the property of becoming cross-linked when exposed to high energy radiation. Examples of other copolymerizable monomers which can be used with the conjugated dienes are alpha-methylstyrene, halogen-substituted styrenes, alkyl-substituted styrenes, alkoxy-substituted styrenes, 2-vinylpyridine, 5-methyl-2-vinylpyridine, 5-ethyl-2-vinylpyridine, 2-methyl-5-vinylpyridine, 4-methyl-2-vinylpyridine, 2-isopropenylpyridine, 5-propyl-2-isopropenylpyride, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

According to one embodiment of my invention, the polymeric materials to be treated with high energy radiation are first blended with the attenuators for high energy radiation. Attenuators which I prefer to use are metals or compounds of metals in which the atomic number of the metal is at least 40. The metal may be used in its free state or as an alloy with other metals or as an organic or inorganic compound. The metal can appear in either the positive or negative portion of the compound or in both. Examples of metals which are used in my invention are zirconium, columbium, molybdenum, silver, cadmium, tin, antimony, tellurium, barium, tantalum, tungsten, uranium, platinum osmium, palladium, bismuth, gold, mercury, lead, and the like. Alloys should contain the heavy metal in a major amount as they serve merely as an alternate form in which the heavy metal can be used. Preferably all of the metals in the alloy have an atomic number of at least 40. Examples of alloys which can be used for my invention are lead-antimony (94–6) alloy, lead-antimony-tin (82–15–3) alloy, lead-cadmium (92–8), lead-copper (99–1), mercury-bismuth (80-20), mercury-copper (70–30), tin-antimony-copper (90–7–3), tin-zinc-aluminum (86–9–5), and the like. These metals are also used as compounds which include such inorganic compounds as oxides, halides, sulfides, borides, nitrides, phosphides, carbides, phosphates, sulfates, nitrates, silicates, carbonates, borates, chromates, and the like of the metals described. Compounds in which the heavy metal occurs in the negative portion include such compounds as molybdates, stannates, antimonates, tungstates, plumbates, and uranates. Examples of heavy metal organic salts which are applicable are lead acetate, mercuric acetate, mercurous acetate, lead propionate, silver acetate, lead naphthenate, and the like. The heavy metal can also can be introduced as organo-metals which are subsequently described.

When metals and alloys are employed, they are generally used in a finely divided form. The attenuation effect is, in general, enhanced as the particle size is decreased but the optimum particle size will depend on the particular system being employed. Any one of several methods of incorporating the metal into the polymeric material can be employed, and the particular methods of blending or incorporating the attenuating agent are not considered a part of this invention, as these can readily be supplied by those skilled in the art. For example, in some cases suitable blending can be effected by a masterbatching operation or, in other instances, particularly when the attenuator is to be used as a filler or reinforcing agent also, the blending or incorporation can be effected by mill mixing or in an internal (Banbury) mixer.

The high energy ionizing radiation atteunator is generally employed in an amount which furnishes between 0.015 and 0.5 gram atom of metal per 100 grams of rubber. The amount used will be determined by the atomic number of the metal in the attenuator. In general, the higher the atomic number, the smaller the quantity of the attenuator required to produce a given effect.

I have found that the metal salts of long chain aliphatic acids have a unique effect in promoting polymer modification by exposure to high energy or ionizing radiation. Metal salts of either saturated or unsaturated aliphatic acids containing from 8 to 30 or more carbon atoms per molecule, and preferably at least 12 carbon atoms per molecule, are very effective in promoting the vulcanization of elastomers by irradiation with gamma rays, alpha particles, beta particles or X-rays. So effective are these salts that it is not essential that the metal have an atomic number of 40 or higher as is the case with other organic metal salts, such as the metal salts of aromatic and cycloaliphatic acids, metal salts of aliphatic acids having from 1 to 7 carbon atoms per molecule, inorganic salts and metals alone. Long chain aliphatic acid salts of metals with atomic numbers lower than 40 have been found highly satisfactory for the vulcanization of GR–S rubber.

The aliphatic acid salts which are useful in this respect are those prepared from saturated and unsaturated, mono- and dicarboxylic long chain acids as above described. The unsaturation can be either olefinic or acetylenic. The acids can contain hydrocarbon substituents on the chain, such as alkyl, cycloalkyl, aryl, alkaryl and aralkyl substituents, and other substituents such as hydroxy, alkoxy, aryloxy, halogen, amino groups, and the like. Preferably, any substituents are short chain alkyl groups such as methyl, ethyl and/or propyl groups. If the substituent is aryl, it is preferably a phenyl group. Examples of suitable saturated monocarboxylic acids include caprylic, capric, lauric, tridecanoic, myristic, palmitic, stearic, arachidic, behenic, lignoceric, cerotic, heptacosanoic, octacosanoic, triacontanoic, 3-methylcaprylic, 2,3-diethylcapric, 2,4-dimethyltridecanoic, 4,5-dimethyl-6-ethylmyristic, 2-methyl-3-ethylstearic, 5-phenylstearic, 2-methyl-6-benzylpalmitic, 7-cyclohexylmyristic, 5-benzyllauric, and 4-tolyltridecanoic acids. Examples of suitable unsaturated monocarboxylic acids include decylenic, dodecylenoic, palmitoleic, oleic, ricinoleic, linoleic, linolenic, gadoleic, cetoleic, 3-octenoic, 2-nonenoic, 9-decenoic, 5-dodecenoic, 7-tridecenoic, 6-pentadecenoic, 9-octadecenoic, 11-octadecenoic, 9,12-octadecadienoic, 9,12,15-octadecatrienoic, 2-methyl-3-ethyl-9-decenoic, 4,5-diethyl-3-dodecenoic, 10-phenyldodecenoic, 5,6-dimethyloctadecenoic, 3-cyclohexyltridecenoic, 3-octynoic, 5-decynoic, 6-dodecynoic, 6-tridecynoic, 8-octadecynoic, 5-n-propyl-3-octynoic, and 3-tolyl-6-decynoic acids.

Examples of suitable saturated dicarboxylic acids include suberic, azelaic, sebacic, hendecanedioic, dodecanedioic, 3,5-di-n-propylsuberic, 4-phenylazelaic, 5-ethylsebacic, 3-methyl-6-benzylhendecanedioic, and 6-tolyltridecanedioic. Examples of suitable unsaturated dicarboxylic acids include 2-octenedioic, 4-decenedioic, 5-hendecenedioic, 7-tetradecenedioic, 3-heptadecenedioic, 4-pentyl-2-decenedioic, 2,5-dodecadienedioic, 3,6-tetradecadienedioic, 3,6-di-tert-butyl-2-octenedioic, 7-phenylhendecenedioic, 2-octynedioic, 5-decynedioic, 4-dodecynedioic, 6-tridecynedioic, 4-phenyl-2-octynedioic, and 5,6-diethyl-4-dodecynedioic acids.

The amount of aliphatic acid metal salt promoter employed is generally in the range of about 0.01 to 0.1 gram mol per 100 grams of polymeric material.

Polymeric material can be blended with the attenuator alone or with other fillers or reinforcing agents such as carbon black or mineral fillers which can include such fillers as clays, silica, kaolin, calcium silicate, titanium dioxide, alumina, magnesia, calcium carbonate, zinc sulfide, and zinc oxide. In elastomeric materials the amount of carbon black or mineral filler employed can range from 0 to 100 parts by weight or higher per 100 parts of elastomer. Certain heavy metal compounds which are useful as attenuators also exhibit reinforcing properties when combined with these elastomers. Examples are molybdenum disulfide and barium sulfate.

As a separate embodiment of my invention, metal or alloy plates are employed as the high energy ionizing radiation atenuator. A sheet or film of the material to be vulcanized is placed between thin plates of the metal instead of blending the finely divided metal with the rubber, and the assembly is subjected to gamma rays or X rays to effect vulcanization. In such an operation it is important that the metal plates and the material to be vulcanized be relatively thin and that firm contact be maintained between the surfaces of the metal and the elastomer. Attenuation with metal plates in this manner produces primarily a surface effect and for this reason is most applicable in vulcanizing films or thin sheets of elastomer. If surface vulcanization only is desired, the thickness of the article is not so limited. In either case, however, the metal plate must be thin to avoid complete absorption of the radiation energy. Since the reaction is a surface effect there is no advantage in using thick plates. Incorporating the metal into the polymeric material is preferred because of the more intimate association realized thereby with improved radiation effects.

In one aspect of my invention a continuous process for irradiating an elongated polymeric structure such as a rod, filament or sheet is provided by continuously passing the formed structure as it comes from an extruder or a roll mill through a zone of neutron-free high energy radiation of gamma rays or X rays, and interposing between the structure and the radiation source a thin metallic shield which is held in close contact with the polymer. The shield contains at least 50 weight percent of a metal having an atomic number of at least 40. This metal absorbs the irradiation and by attenuation of the irradiation, with the production of a secondary electron effect, enhances the vulcanization which is produced in the polymer. This process can be conveniently carried out by irradiating the polymer as it passes through the die of a plastics extruder with the die itself composed of the attenuating metal and positioned in relation to irradiation source in such a manner as to permit the primary radiation to be attenuated and the secondary effects applied directly to the surface of the polymer as it passes through the die. Alternatively the irradiation can be conducted on a roll mill by carrying an irradiation source within at least one of the rolls on the mill and constructing the roll of an attenuating metal having an atomic number of at least 40. Suitable radiation sources which can be positioned around an extruder die or within a roll of a roll mill include cobalt-60 (half life 5.2 years), cesium-137 (half-life of 30 years), tantalum-182 and spent fuel elements. These are gamma ray sources which provide the radiation I prefer in this aspect of my invention. By gamma rays I means those rays which are not deflected by a magnetic field and which have a wave length in the region of about $10^{-9}$ to $10^{-11}$ centimeters. Materials which are described as gamma ray emitters having long half life are generally preferred for the source.

The materials which are preferred for construction of the dies or rolls are those which form hard carbides and nitrides, particularly the elements in the B sub-groups of groups IV, V and VI of the periodic table. These elements include zirconium, niobium, molybdenum, hafnium, tantalum and tungsten. One or more of these elements can be used in essentially the pure state or as alloys which can be readily fabricated into vessels, molds, dies, and the like. Such alloys comprise preferably at least 50 percent by weight of one or more of the heavy metals.

The compounds of these metals which are preferred are the carbides and nitrides because of their stability at high temperatures, their hardness and abrasion resistance. Other compounds such as the oxides, sulfides and halides can be fabricated by cementing into the desired shape. One forming method which is particularly applicable with the metal carbides and nitrides involves forming a mixture of low melting alloy, such as a lead-tin eutectic or an iron or nickel alloy, in minor amount with the heavy metal or heavy metal compound to form what is known as a cemented carbide or nitride. The molten mixture of the alloy and the metal carbide or nitride is poured into graphite molds to produce dies or other objects of the desired shape.

Metal nitrides are most useful in providing a wear resistant film on the surface of the metal tool. Thus the heavy metal or alloy can be fabricated into the desired object and subsequently the surfaces thereof can be nitrided to give a surface which is resistant to abrasion. The effective thickness of the metal at points of irradiation should be less than 1 centimeter and preferably less than 100 mils.

Figure 1:
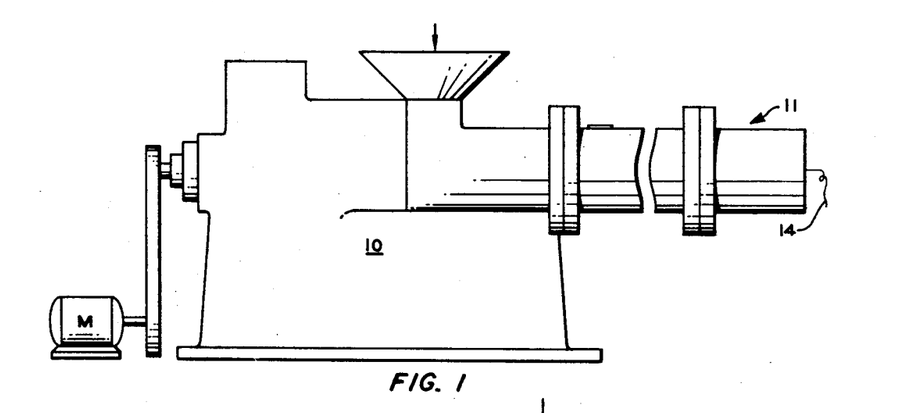
FIGURE 1 depicts extrusion apparatus for continuously irradiating a polymeric filament.

To further describe the process and appartus of this aspect of my invention, reference is now made to the drawings. FIGURE 1 shows a plastics extruder 10 which is equipped with an extrusion head 11 containing a heavy metal shield and radiation source as above described. In FIGURE 1, showing head 11 in detail, molten polymer 12 is extruded through die 13 to form the polymeric strand 14. The walls of die 13 are composed of a heavy metal having an atomic number greater than 40, preferably a carbide or nitride of the metal as above described. For example, the filament die can be fabricated from tungsten carbide (60 percent) which has been cemented with an iron alloy. In this instance an elongated cylindrical die having relatively thin walls is used. Typical die dimensions are a length of 20 centimeters, an outside diameter of 1 centimeter, and a cylindrical opening of approximately 0.005 millimeter in diameter. The cylindrical die is surrounded by a cylindrical radiation source 16 such as cobalt-60. The radiation source is held in position about die 13 by cap 17 which secures the radiation source and extrusion die in nozzle 18. Heat exchange coils 19 for temperature control are provided about the radiation source and the entire assembly is encased within radiation shield 20 which also contains heat exchange coils 21 for heating or cooling. A suitable radiation shield is concrete containing barium sulfate. As the polymer is extruded through the die, gamma radiation from cylinder 16 is attenuated by the heavy metal of die 13 and the secondary electron effects produced increase the degree of cross-linking contained in the polymeric strand. The rate of extrusion is adjusted to provide the required total dosage as subsequently given. In addition to the arrangement shown in FIGURE 1, the extruder nozzle can have an inner liner fabricated from the heavy metal. This liner in turn can be surrounded by a gamma ray source such as cobalt-60. In this manner the material can be irradiated in the extruder as well as while it is being passed through the die.

Figure 2:
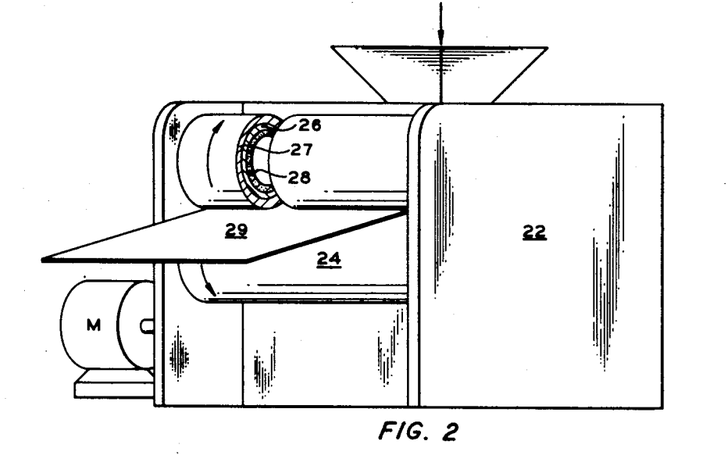
FIGURE 2 shows similar apparatus in the form of a roll mill for pressing sheet.
Figure 3:
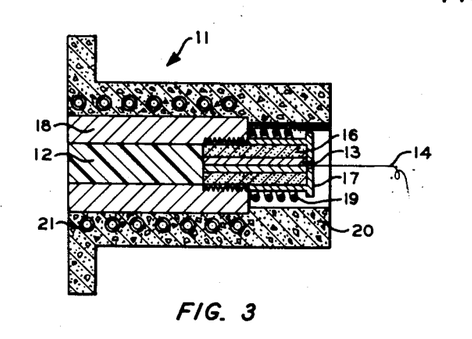

FIGURE 2 shows how my invention can be adapted to a roll mill. In this embodiment roll mill 22 contains rolls 24 and 26. Upper roll 26 has an outer coating 27 of a heavy metal nitride or carbide. The interior of the roll is lined with a layer 28 of gamma ray emitting material. Polymer can thus be worked and irradiated continuously in much the same manner as described in connection with the plastics extruder of FIGURE 1 to form film 29.

When processing polymers in which the net effect of high energy radiation is cross-linking, I prefer to use for a cross-linking promoter the organometal previously mentioned. These organometal promoters can be represented by the formula $R_nMeX_m$ wherein Me is a metal having an atomic number of at least 30, preferably 40 and above, each R is an organic radical selected from the group consisting of alkyl, aryl, aralkyl, cycloalkyl and alkaryl, each X is a halogen (fluorine, chlorine, bromine or iodine), $n$ is an integer not less than 1 and the sum of $n$ plus $m$ is equal to the valence of the metal. The number of carbon atoms in each R group generally does not exceed 12 and when more than one R group or more than one halogen is present, they may be alike or different. The heavy metals which are preferred are those having atomic numbers in the required range of 40 and above as described in connection with the radiation attenuators. However, metals in the atomic number range of 30 to 39 are also applicable provided, of course, that the metals will form compounds of the organometallic type. Generally, the halogen is not present although such compounds as triphenyltin chloride are suitable.

Examples of these metals are zinc, lead, mercury, tin, antimony, bismuth, cadmium, and the like. Examples of these organometallic promoters include tetraethyllead, tetraisobutyllead, tetraisopropyllead, tetramethyllead, tetraphenyllead, tetra-n-propyllead, diphenylzinc, diphenylmercury, di-n-amylmercury, dibenzylmercury, di-n-butylmercury, diethylmercury, di-n-hexylmercury, diiosoamylmercury, diisobutylmercury, diisopropylmercury, dimethylmercury, di-naphthylmercury, diphenylmercury, di-n-propylmercury, ditolylmercury, triethylantimony, trimethylantimony, triphenylantimony, dibenzyldiethyltin, dibenzylethylpropyltin, diethyldiisoamyltin, diethyldiisobutyltin, diethyldiphenyltin, diethyltin, dimethyldiethyltin, dimethyldiisobutyltin, dimethylethylpropyltin, dimethyltin, diphenyltin, di-p-tolyltin, di-p-xylyltin, thyl-n-propyldiisoamyltin, ethyltri-n-butyltin, ethyltri-n-propyltin, methyltri-n-butyltin, phenyltribenzyltin, tetraamyltin, tetrabenzyltin, tetra-n-butyltin, tetracyclohexyltin, tetraethyltin, tetra-n-heptyltin, tetra-n-hexyltin, tetraisoamyltin, tetraisobutyltin, tetramethyltin, tetra-n-octyltin, tetraphenyltin, tetra-n-propyltin, tetra-o-tolyltin, tetra-n-xylyltin, tribenzylethltin, triethyl-n-amyltin, triethylisoamyltin, triethylisobutyltin, triethylphenyltin, triethyltin, trimethyltin, triphenylbenzyltin, triphenyl-p-tolyltin, triphenyl-p-xylyltin, tri-n-propyl-n-butlytin, tri-n-propylethyltin, triethylbismuth, trimethylbismuth, triphenylbismuth, diisoamylcadmium, di-n-butylcadmium, diisobutylcadmium, diethylcadmium, dimethylcadmium, and di-n-propylcadmium.

The amount of organometallic promoter employed will generally be in the range between 0.005 and 0.1 gram moles per 100 grams of elastomer to be vulcanized. As previously stated, the organometal can be incorporated into the rubber alone or with reinforcing agents such as carbon black or mineral fillers.

Following preparation of the polymeric material as above described the irradiation is preferably conducted by placing the material adjacent a spent fuel element or a group of fuel elements after their withdrawal from a nuclear reactor. The radiation can be conveniently carride out while the elements are "cooling off" in a canal adjacent the reactor, which canal is filled with deionized water. The fuel elements can be any suitable type which are capable of producing radiation intensities within the range hereinafter specified. In the specific examples which follow, the fuel elements consisted of a series of uranium plates enriched in uranium-235, each sheet being covered with a relatively thin sheet of aluminum. This work is done at the Materials Testing Reactor at Arco, Idaho, which is described in an article by John R. Huffman appearing in Nucleonics, 12, No. 4, 21–26 (April 1954).

The material to be irradiated is placed sufficiently close to the fuel elements to obtain a "nominal" dosage of about $10^5$ to $5 \times 10^8$ rep (Roentgen equivalent physical). Radiation dosages and rates as used in this discussion, examples and claims are the actual dosages received by the control specimen (no promoter) in the same radiation field. The unit of Roentgen equivalent physical corresponds to an absorption of 93 ergs/gram of material, the material being water, hydrocarbon or rubber which have very nearly the same absorption coefficients. It is to be understood, however, that the actual energy absorbed by the modified materials of my invention will be higher than the dosages given in terms of the control. The radiation rate can vary from about $10^3$ to $3 \times 10^7$ rep per hour. Lower rates can be used but are not practicable from a time standpoint. Higher rates, e.g., up to $10^9$ rep, are quite difficult to attain and, although usable, are not necessary for the practice of my invention.

The radiation produced by the above described spent fuel elements is gamma radiation but X rays can also be employed provided the described radiation intensity and dosage are utilized. Any radiation which will produce ionization can be used to practive my invention. For example, either alpha or beta radiation is suitable. Because of the low penetrating power of this type of radiation, the source should be of an internal nature. In certain applications, particularly when using an organometallic promoter, fast neutrons can be employed with enhanced effects. Neutron radiation is less desirable however, and care must be exercised to filter out slow neutrons so that a minimum of residual radioactivity is produced in the materials being irradiated. The time of radiation can vary so long as the prescribed dosage and radiation intensity are maintained. The temperature at which the irradiation is conducted will generally vary in the range between 50 and 100° F., although higher or lower temperatures can be used if desired.

The radiation dosage required for attaining the desired degree of cross-linking will differ with different rubbers to be vulcanized as well as with the high energy radiation attenuator employed.

In further description of my invention the following examples are presented which are exemplary only and should not be interpreted as limiting my invention unduly.

EXAMPLE I

High abrasion furnace black (Philblack O) was blended on the mill with a 75/25 butadiene/styrene rubber prepared by emulsion polymerization at 41° F. and having a Mooney value (ML-4) of 52±6. Fifty parts by weight of black was used per 100 parts of rubber. One stock was reserved as a control while an inorganic metal compound was incorporated into each of the others. Each metal compound was employed in an amount such that 0.09 gram atom of metal was present per 100 grams of rubber. The samples were sheeted off the mill and pressed in a hydraulic press between sheets of Holland cloth to give sheets having a thickness of approximately 60 mils. Test specimens were cut from the resulting sheets and packed into aluminum cans which were closed, purged with nitrogen, and irradiated in a field of gamma rays from spent fuel elements from the materials Testing Reactor at Arco, Idaho, at a canal temperature of approximately 75° F. A pressure of 25 pounds nitrogen was maintained in the cans during irradiation. Some samples received a total dosage of $1 \times 10^7$ rep (dosage rate was $4.56 \times 10^6$ rep per hour for 2.2 hours), others $3 \times 10^7$ rep (dosage rate was $4.50 \times 10^6$ rep per hour for 6.6 hours), and still others $1 \times 10^8$ rep (dosage rate was $4.38 \times 10^6$ rep per hour for the first 9.28 hours and $12.9 \times 10^6$ rep per hour for the last 4.55 hours). Following removal of the samples from the gamma ray field the degree of vulcanization was determined, which is expressed in terms of density of network chains. Results were as follows:

Table I

| Meta compound | | Atomic number of metal | Radiation dosage, rep | | |
|---|---|---|---|---|---|
| Type | Phr.[1] | | $1 \times 10^7$ | $3 \times 10^7$ | $1 \times 10^8$ |
| | | | $\nu \times 10^4$ | moles | per cc.[2] |
| None (control) | | | 0.22 | 0.87 | 3.6 |
| Magnesium oxide | 3.6 | 12 | 0.23 | 0.91 | 3.20 |
| Magneisum carbonate | 7.6 | 12 | 0.24 | 0.94 | 3.30 |
| Magnesium sulfate | 10.8 | 12 | 0.24 | 0.95 | 3.30 |
| Alumina | 4.6 | 13 | 0.25 | 0.96 | 3.20 |
| Silica | 5.4 | 14 | 0.27 | 0.99 | 3.30 |
| Calcium carbonate, C.P. | 9.0 | 20 | 0.22 | 0.99 | 3.20 |
| Calcium carbonate, Purecal U. | 9.0 | 20 | 0.24 | 0.92 | 3.30 |
| Calcium sulfate | 12.2 | 20 | 0.25 | 0.91 | 3.35 |
| Calcium oxide | 5.0 | 20 | 0.23 | 0.90 | 3.30 |
| Cupric oxide | 7.2 | 29 | 0.24 | 0.88 | 3.30 |
| Zinc oxide | 7.4 | 30 | 0.24 | 0.98 | 3.35 |
| Zirconium oxide | 11.0 | 40 | 0.29 | 0.99 | 3.80 |
| Molybdenum disulfide | 14.4 | 42 | 0.34 | 1.20 | 4.35 |
| Cadmium oxide | 11.6 | 48 | 0.30 | 1.08 | 4.30 |
| Cadmium carbonate | 15.6 | 48 | 0.30 | 1.06 | 4.30 |
| Barium carbonate | 17.8 | 56 | 0.33 | 1.18 | 5.20 |
| Barium sulfate | 21.0 | 56 | 0.34 | 1.15 | 5.20 |
| Tantalum carbide | 17.4 | 73 | 0.33 | 1.15 | 5.20 |
| Tungsten disulfide | 22.4 | 74 | 0.29 | 1.07 | 4.70 |
| Mercuric oxide | 19.4 | 80 | 0.42 | 1.33 | 7.40 |
| Lead oxide | 20.0 | 82 | 0.36 | 1.25 | 6.25 |
| Sodium uranate | 31.4 | 92 | 0.38 | 1.42 | 7.15 |

[1] Parts per 100 parts rubber.
[2] The density of network chains is related to the number of cross-links by the function $\nu = 2n - \frac{2\delta}{M}$ where $n$ is the number of cross-links, $\delta$ is the density of the polymer and $M$ is the molecular weight.

As illustrated by the above data, a marked increase in cross-linking is effected by the metal compounds containing metals having an atomic number of at least 40. As shown by the excellent results produced by lead oxide and sodium uranate, the heavy metal can occur in either the positive or negative portion of the compound. In reality, the important factor is the presence of the heavy metal atoms.

EXAMPLE II

A butadiene/styrene rubber-carbon black masterbatch was prepared as described in Example I using the same materials and a loading of 50 parts by weight of black per 100 parts rubber. Different metal compounds were incorporated into portions of the masterbatch, each in an amount such that 0.09 gram atom of metal was present per 100 grams of rubber. Samples were also prepared which contained only the rubber and metal compound, the metal compound being used in an amount corresponding (by volume) to a Philblack O loading of 50 parts by weight per 100 parts rubber. Samples of the rubber alone and rubber plus black were reserved as controls. Each material was sheeted off the mill and pressed in a hydraulic press between sheets of Holland cloth to give sheets having a thickness of approximately 60 mils. Test specimens were cut, packed into aluminum cans, and irradiated as described in the foregoing example. The samples were irradiated for 200 hours at a dosage rate of $1.5 \times 10^5$ rep per hour to give a total dosage of $3 \times 10^7$ rep. Stress-strain and swelling data were obtained on the irradiated materials. The following results were obtained:

Table II

| Sample | Metal compound, phr | Atomic number of metal | Swell $V_r$[1] | 300% modulus, p.s.i. | Tensile, p.s.i. | Elongation, percent |
|---|---|---|---|---|---|---|
| Rubber only | | | 0.3327 | 200 | 220 | 410 |
| Rubber plus black | | | 0.3276 | 950 | 2,580 | 690 |
| Rubber plus zirconium oxide | 171 | 40 | 0.3826 | 290 | 450 | 480 |
| Rubber plus barium sulfate | 146 | 56 | 0.3841 | 240 | 1,030 | 700 |
| Rubber plus lead oxide | 286 | 82 | 0.4585 | | 400 | 50 |
| Rubber plus black plus zirconium oxide | 11 | 40 | 0.3341 | 1,210 | 2,430 | 550 |
| Rubber plus black plus barium sulfate | 21 | 56 | 0.3628 | 1,440 | 2,810 | 540 |
| Rubber plus black plus lead oxide | 20 | 82 | 0.4140 | 1,890 | 2,090 | 340 |

[1] In heptane; $V_r$ equals volume fraction of polymer in swollen gel.

It can be readily seen from the data on swell that the presence of each metal compound promotes vulcanization. The samples containing lead oxide appear to be overcured, judging by the physical properties. The data show that the metal compounds alone do not have the same reinforcing effect on the rubber as does the black, but when used with black compare favorably with the black alone. As the atomic number increases, there is an increase in the degree of cure when the same radiation level is used.

EXAMPLE III

The procedure of the foregoing examples was followed using various metal compounds in different portions of the rubber-carbon black masterbatch. In each instance the amount of metal compound was such that 0.09 gram atom of metal was present per 100 grams of rubber. The samples were irradiated, first at a dosage rate of $1.24 \times 10^6$ rep per hour for 17.88 hours and then at a dosage rate of $1.16 \times 10^6$ rep per hour for 7.60 hours to give a total dosage of $3.1 \times 10^7$ rep. Stress-strain and swelling data were obtained as in Example II. Results are reported in Table III.

*Table III*

| Sample | Metal compound, phr | Atomic number of metal | Swell $V_r$ | 300% modulus, p.s.i. | Tensile, p.s.i. | Elongation, percent |
|---|---|---|---|---|---|---|
| Rubber plus black plus magnesium oxide | 3.6 | 12 | 0.372 | 1,240 | 3,050 | 550 |
| Rubber plus black plus alumina | 4.6 | 13 | 0.373 | 1,490 | 2,850 | 520 |
| Rubber plus black plus silica | 5.4 | 14 | 0.374 | 1,630 | 2,860 | 500 |
| Rubber plus black plus barium sulfate | 21 | 56 | 0.411 | 2,270 | 2,960 | 390 |

These data show that a much tighter cure is obtained in the sample containing barium sulfate.

It should be noted that barium sulfate was used in both this and the preceding example and the quantity was the same in both cases. Even though the total radiation dosage was the same in each instance, the dosage rates were different and there was a difference in the state of cure. With the assumption that the degree of cross-linking is a linear function of the dosage, the level of cross-linking for the rubber plus black sample of Example II was calculated for Example III using the barium sulfate stock as the basis. The value obtained for $V_r$ was 0.372. It is thus concluded that the magnesium oxide, alumina, and silica had little, if any, effect on the cure while a very pronounced effect resulted with the barium sulfate.

EXAMPLE IV

Samples were prepared as described in Example I and irradiated in the same manner using rubber plus carbon black as the control and a similar sample into which was incorporated 20 phr. of lead oxide. The samples were irradiated at a dosage rate of $4.50 \times 10^6$ rep per hour for 6.6 hours and received a total dosage of $3 \times 10^7$ rep. The degree of cross-linking and stress-strain properties was determined. Results were as follows:

*Table IV*

| | $\nu \times 10^4$, moles per cc.[1] | 300% modulus, p.s.i. | Tensile, p.s.i. | Elongation, percent |
|---|---|---|---|---|
| Rubber plus black | 0.85 | 1,130 | 1,900 | 540 |
| Rubber plus black plus lead oxide | 1.25 | 1,440 | 2,810 | 540 |

[1] As in Example I.

The advantage of using the lead oxide attenuator is apparent above. This run showed superior results over that reported in Table II which was irradiated at a slower rate.

EXAMPLE V

Fifty parts by weight of high abrasion furnace black (Philblack O) was blended on the mill with 100 parts of 75/25 butadiene/styrene rubber prepared by emulsion polymerization at 41° F. and having a Mooney value (ML-4) of 52±6. Tetraethyllead (31.6 grams, 0.098 mole) was incorporated into the rubber-carbon black masterbatch. Samples of this material, and also of the masterbatch without tetraethyllead, were sheeted off the mill and pressed in a hydraulic press between sheets of Holland cloth to give sheets having a thickness of approximately 60 mils. Test specimens were cut from the resulting sheets and placed in aluminum cans which were closed, purged with nitrogen, and irradiated in a field of gamma rays from spent fuel elements at the Materials Testing Reactor at Arco, Idaho, at a canal temperature of approximately 75° F. A pressure of 25 pounds nitrogen was maintained in the cans during irradiation. Results obtained after a dosage of $1 \times 10^7$ rep (dosage rate of $4.56 \times 10^6$ rep per hour for 2.2 hours) were as follows:

*Table V*

| | $\nu \times 10^4$ moles/cc. [1] | 300% modulus, p.s.i. | Tensile, p.s.i. | Elongation, percent |
|---|---|---|---|---|
| Masterbatch | 0.22 | 340 | 950 | 730 |
| Masterbatch plus tetraethyllead | 0.67 | 990 | 1,200 | 370 |

[1] The density of network chains is related to the number of cross-link by the function $\nu = 2n - \frac{2\delta}{M}$ where $n$ is the number of cross-links, $\delta$ is the density of the polymer, and $M$ is the molecular weight.

These data show that much more cross-linking occurs in the sample containing tetraethyllead as evidenced by the higher values for $\nu$, modulus, and tensile strength. A higher radiation dosage would be required for the masterbatch without tetraethyllead to give an equivalent cure.

EXAMPLE VI

The procedure of Example I was followed except that 3.9 grams, 0.012 mole of tetraethyllead was incorporated into the masterbatch instead of 31.6 grams. The same irradiation procedure was followed. Results obtained after a dosage of $3 \times 10^7$ rep (dosage rate of $4.50 \times 10^6$ rep per hour for 6.6 hours) are shown in Table VI.

*Table VI*

| | $\nu \times 10^4$ moles/cc.[1] | 300% modulus, p.s.i. | Tensile, p.s.i. | Elongation, percent |
|---|---|---|---|---|
| Masterbatch | 0.85 | 1,130 | 1,900 | 540 |
| Masterbatch plus tetraethyllead | 1.65 | 2,600 | 2,600 | 300 |

[1] As in Example I.

Comparing the degree of cross-linking reported in Table I for samples using lead oxide with those employing tetraethyllead, Tables V and VI, it is evident that for the same radiation rates and total dosage, equivalent amounts of the organometal, on a mol basis, are superior to the inorganic salt in cross-linking promotion. It is believed that a dual effect, gamma ray attenuation with secondary election production plus free radical formation, is responsible.

EXAMPLE VII

High abrasion furnace black (Philblack O) was blended on the mill with a 75/25 butadiene/styrene rubber prepared by emulsion polymerization at 41° F. and having a Mooney value (ML-4) of 52±6. The blend had a ratio of 50 parts by weight of carbon black per 100 parts of rubber. Samples were prepared as described in the previous examples by incorporating various amounts of metal compounds in the rubber-carbon black compositions. Samples without the metal additive were reserved as controls. Test specimens were then irradiated following the procedure described in the previous examples employing various radiation rates and total dosages. The effects in promoting vulcanization by inorganic metal compounds, a metal salt of an organic acid and various organometals are reported in the following tables:

energy is removed from the gamma field by the elastomeric composition. It is evident that when identical samples are irradiated to the same dosage but at different rates,

Table VII

[Total dosage, $3 \times 10^7$ rep]

| Attenuator | Atomic number of heavy metal | Gram atom of metal/100 grams rubber | Dose rate | | | | | |
|---|---|---|---|---|---|---|---|---|
| | | | $1 \times 10^5$ rep/hr. | | $1 \times 10^6$ rep/hr. | | $1 \times 10^7$ rep/hr. | |
| | | | $V_r$ [a] | $\nu \times 10^4$ (moles/cc.) | $V_r$ [a] | $\nu \times 10^4$ (moles/cc.) | $V_r$ [a] | $\nu \times 10^4$ (moles/cc.) |
| None | | | 0.3943 | 1.26 | 0.3868 | 1.17 | 0.3685 | 0.98 |
| Zirconium oxide | 40 | 0.029 | 0.3996 | 1.33 | 0.3804 | 1.10 | 0.3816 | 1.12 |
| Do | 40 | 0.090 | 0.4116 | 1.47 | 0.3923 | 1.23 | 0.3892 | 1.20 |
| Do | 40 | 0.179 | 0.4234 | 1.65 | 0.3982 | 1.30 | 0.4046 | 1.39 |
| Cadmium oxide | 48 | 0.030 | 0.4015 | 1.35 | 0.3761 | 1.06 | 0.3907 | 1.22 |
| Do | 48 | 0.090 | 0.4176 | 1.57 | 0.3889 | 1.21 | 0.4030 | 1.38 |
| Do | 48 | 0.179 | 0.4349 | 1.85 | 0.4001 | 1.33 | 0.4211 | 1.62 |
| Tantalum carbide | 73 | 0.030 | 0.4080 | 1.43 | 0.3777 | 1.08 | 0.3971 | 1.28 |
| Do | 73 | 0.090 | 0.4331 | 1.82 | 0.4025 | 1.37 | 0.4207 | 1.60 |
| Do | 73 | 0.179 | 0.4580 | 2.30 | 0.4235 | 1.66 | 0.4458 | 2.03 |
| Mercuric oxide | 80 | 0.030 | 0.4732 | 2.60 | 0.4643 | 2.41 | 0.4519 | 2.07 |
| Do | 80 | 0.090 | 0.5110 | 3.70 | 0.4695 | 2.57 | 0.4920 | 3.06 |
| Do | 80 | 0.179 | 0.5416 | 5.20 | 0.5195 | 4.12 | 0.5142 | 3.85 |
| Lead oxide | 82 | 0.030 | 0.4410 | 1.95 | 0.4273 | 1.70 | 0.4279 | 1.72 |
| Do | 82 | 0.090 | 0.4841 | 2.90 | 0.4636 | 2.40 | 0.4648 | 2.43 |
| Do | 82 | 0.179 | 0.5204 | 4.15 | 0.4866 | 2.95 | 0.4955 | 3.22 |
| Sodium uranate | 92 | 0.030 | 0.4262 | 1.70 | 0.4017 | 1.35 | 0.4158 | 1.55 |
| Do | 92 | 0.090 | 0.4664 | 2.45 | 0.4429 | 2.00 | 0.4533 | 2.18 |
| Do | 92 | 0.179 | 0.5029 | 3.45 | 0.4716 | 2.60 | 0.4887 | 3.08 |
| Lead fluoride | 82 | 0.090 | 0.4496 | 2.12 | 0.4213 | 1.61 | 0.4425 | 1.98 |
| Lead chloride | 82 | 0.090 | 0.4455 | 2.02 | 0.4280 | 1.73 | 0.4381 | 1.90 |
| Lead bromide | 82 | 0.090 | 0.4541 | 2.20 | 0.4209 | 1.61 | 0.4444 | 2.00 |
| Lead iodide | 82 | 0.090 | 0.4827 | 2.85 | 0.4540 | 2.20 | 0.4656 | 2.43 |
| Mercuric iodide | 80 | 0.090 | 0.4674 | 2.50 | 0.4272 | 1.70 | 0.4371 | 1.90 |

[a] Volume fraction of rubber in swollen gel.

Table VIII

[Dose rate $1 \times 10^6$ rep/hr.]

| Attenuator | Atomic number of heavy metal | Gram atom of metal/100 grams rubber | Total Dosage | | | | | |
|---|---|---|---|---|---|---|---|---|
| | | | $1 \times 10^7$ rep | | $3 \times 10^7$ rep | | $7 \times 10^7$ rep | |
| | | | $V_r$ [a] | $\nu \times 10^4$ (moles/cc.) | $V_r$ [a] | $\nu \times 10^4$ (moles/cc.) | $V_r$ [a] | $\nu \times 10^4$ (moles/cc.) |
| None | | | 0.2411 | 0.266 | 0.3868 | 1.17 | 0.4801 | 2.80 |
| Zirconium oxide | 40 | 0.029 | 0.2508 | 0.296 | 0.3804 | 1.10 | 0.4870 | 3.00 |
| Do | 40 | 0.090 | 0.2584 | 0.325 | 0.3923 | 1.23 | 0.4965 | 3.25 |
| Do | 40 | 0.179 | 0.2725 | 0.375 | 0.3982 | 1.30 | 0.5028 | 3.45 |
| Cadmium oxide | 48 | 0.030 | 0.2539 | 0.310 | 0.3761 | 1.06 | 0.4876 | 3.00 |
| Do | 48 | 0.090 | 0.2648 | 0.348 | 0.3889 | 1.21 | 0.5002 | 3.37 |
| Do | 48 | 0.179 | 0.2863 | 0.425 | 0.4001 | 1.33 | 0.5150 | 3.90 |
| Tantalum carbide | 73 | 0.030 | 0.2655 | 0.350 | 0.3777 | 1.08 | 0.4915 | 3.10 |
| Do | 73 | 0.090 | 0.2886 | 0.440 | 0.4025 | 1.37 | 0.5130 | 3.85 |
| Do | 73 | 0.179 | 0.3152 | 0.580 | 0.4235 | 1.66 | 0.5348 | 4.83 |
| Mercuric oxide | 80 | 0.030 | 0.3390 | 0.740 | 0.4643 | 2.41 | 0.5250 | 4.35 |
| Do | 80 | 0.090 | 0.3856 | 1.16 | 0.4695 | 2.57 | 0.5673 | 6.50 |
| Do | 80 | 0.179 | 0.4160 | 1.55 | 0.5195 | 4.12 | 0.6117 | 9.10 |
| Lead oxide | 82 | 0.030 | 0.2884 | 0.440 | 0.4272 | 1.70 | 0.5216 | 4.20 |
| Do | 82 | 0.090 | 0.3360 | 0.710 | 0.4636 | 2.40 | 0.5542 | 5.80 |
| Do | 82 | 0.179 | 0.3743 | 1.04 | 0.4866 | 2.95 | 0.5867 | 7.65 |
| Sodium uranate | 92 | 0.030 | 0.2784 | 0.400 | 0.4017 | 1.35 | 0.5061 | 3.55 |
| Do | 92 | 0.090 | 0.3314 | 0.675 | 0.4429 | 2.00 | 0.5338 | 4.80 |
| Do | 92 | 0.179 | 0.3685 | 0.960 | 0.4716 | 2.60 | 0.5756 | 7.00 |
| Lead fluoride | 82 | 0.090 | 0.3026 | 0.505 | 0.4213 | 1.61 | 0.5286 | 4.50 |
| Lead chloride | 82 | 0.090 | 0.2963 | 0.470 | 0.4280 | 1.73 | 0.5234 | 4.30 |
| Lead bromide | 82 | 0.090 | 0.3030 | 0.510 | 0.4209 | 1.61 | 0.5287 | 4.50 |
| Lead iodide | 82 | 0.090 | 0.3367 | 0.590 | 0.4540 | 2.20 | 0.5582 | 6.00 |
| Mercuric iodide | 80 | 0.090 | 0.3307 | 0.575 | 0.4272 | 1.70 | 0.5246 | 4.35 |

[a] Volume fraction of rubber in swollen gel.

As shown by the data in Tables VII and VIII, the degree of vulcanization is, in general, a function of dose rate, dosage, attenuator loading, and attenuator absorption cross-section for gamma rays. It is clear that by increasing the atomic number of the attenuator, more the degree of cure decreases with dose rate. This is particularly true in the case of the black stock alone; however, in the presence of attenuators a minimum in degree of cure is observed somewhere between $10^6$ rep per hour and $10^7$ rep per hour. The cause of this unexpected effect is not fully understood. It is clear, however, that the advantage of my invention is quite pronounced over a broad range of radiation rates.

*Table IX*

| Promoter | Atomic number of heavy metal | Gram atom of metal/ 100 grams rubber | Dosage, rep | Dose rate rep per hour | 300% modulus (p.s.i.) | Tensile strength (p.s.i.) | Percent Elongation | $V_r$ | $\nu \times 10^4$ (moles/cc.) |
|---|---|---|---|---|---|---|---|---|---|
| None | | | $7 \times 10^6$ | $5.34 \times 10^6$ | 200 | 460 | 840 | .1974 | 0.160 |
| Lead tetraacetate | 82 | 0.015 | $7 \times 10^6$ | $5.34 \times 10^6$ | 300 | 415 | 580 | .2124 | 0.190 |
| Do | 82 | 0.031 | $7 \times 10^6$ | $5.34 \times 10^6$ | 400 | 600 | 550 | .2455 | 0.280 |
| None | | | $1 \times 10^7$ | $4.8 \times 10^6$ | 360 | 800 | 590 | .2337 | 0.250 |
| Lead tetraacetate | 82 | 0.015 | $1 \times 10^7$ | $4.8 \times 10^6$ | 390 | 540 | 480 | | 0.330 |
| Do | 82 | 0.031 | $1 \times 10^7$ | $4.8 \times 10^6$ | 490 | 920 | 580 | .2873 | 0.435 |
| None | | | $3 \times 10^7$ | $4.56 \times 10^6$ | 1,210 | 2,380 | 520 | .3656 | 0.96 |
| Lead tetraacetate | 82 | 0.015 | $3 \times 10^7$ | $4.56 \times 10^6$ | 1,010 | 1,160 | 360 | .3769 | 1.03 |
| Do | 82 | 0.031 | $3 \times 10^7$ | $4.56 \times 10^6$ | 1,530 | 2,100 | 410 | .4108 | 1.47 |

The attenuation effect of lead as a salt of an organic acid is shown by the above table. Improvement in the degree of cure is evident at various dosages and dose rates.

*Table X*

[Dosage $7 \times 10^6$ rep (dose rate $5.34 \times 10^6$ rep/hr.)]

| Promoter | Atomic number of central atom | Gram mols promoter/ 100 grams rubber | 300% modulus (p.s.i.) | Tensile strength (p.s.i.) | Percent elongation | $V_r$ | $\nu \times 10^4$ (moles/cc.) |
|---|---|---|---|---|---|---|---|
| None | | | 200 | 460 | 840 | .1974 | 0.160 |
| Triphenylmethane | 6 | 0.015 | 175 | 280 | 630 | .1960 | 0.157 |
| Do | 6 | 0.031 | 140 | 245 | 830 | .1790 | 0.130 |
| Tetraethyl-o-silicate | 14 | 0.015 | 160 | 315 | 620 | .1923 | 0.150 |
| Do | 14 | 0.031 | 185 | 370 | 760 | .2040 | 0.174 |
| Triethylphosphate | 15 | 0.015 | 160 | 330 | 820 | .1999 | 0.165 |
| Do | 15 | 0.031 | 130 | 280 | 810 | .1960 | 0.163 |
| Diphenylzinc | 30 | 0.015 | 165 | 405 | 810 | .1978 | 0.161 |
| Do | 30 | 0.031 | 185 | 400 | 780 | .1981 | 0.163 |
| Triphenyltin chloride | 50 | 0.015 | 220 | 470 | 780 | .3139 | 0.195 |
| Do | 50 | 0.031 | 295 | 335 | 780 | .2282 | 0.232 |
| Tetraphenyltin | 50 | 0.015 | 250 | 410 | 590 | .2063 | 0.183 |
| Do | 50 | 0.031 | 255 | 255 | 320 | .2351 | 0.251 |
| Triphenylstibine | 51 | 0.015 | 205 | 435 | 630 | .2242 | 0.220 |
| Do | 51 | 0.031 | 225 | 525 | 690 | .2315 | 0.240 |
| Diethylmercury | 80 | 0.015 | 225 | 515 | 690 | .2316 | 0.240 |
| Do | 80 | 0.031 | 215 | 675 | 800 | .2411 | 0.268 |
| Diphenylmercury | 80 | 0.015 | 260 | 560 | 670 | .2153 | 0.198 |
| Do | 80 | 0.031 | 295 | 565 | 605 | .2356 | 0.250 |
| Tetraethyllead | 82 | 0.015 | 380 | 545 | 610 | .2334 | 0.246 |
| Do | 82 | 0.031 | 355 | 910 | 690 | .2647 | 0.348 |
| Tetraphenyllead | 82 | 0.015 | 415 | 735 | 560 | .2541 | 0.310 |
| Do | 82 | 0.031 | 365 | 715 | 580 | .2706 | 0.365 |

*Table XI*

[Dosage $1 \times 10^7$ rep (dose rate $4.8 \times 10^6$ rep/hr.)]

| Promoter | Atomic number of central atom | Gram mols promoter/ 100 grams rubber | 300% modulus (p.s.i.) | Tensile strength (p.s.i.) | Percent elongation | $V_r$ | $\nu \times 10^4$ (moles/cc.) |
|---|---|---|---|---|---|---|---|
| None | | | 360 | 800 | 590 | .2337 | 0.250 |
| Triphenylmethane | 6 | 0.015 | 330 | 490 | 670 | .2158 | 0.200 |
| Do | 6 | 0.031 | 180 | 390 | 670 | .2133 | 0.195 |
| Tetraethyl-o-silicate | 14 | 0.015 | 290 | 560 | 560 | .2315 | 0.240 |
| Do | 14 | 0.031 | 280 | 640 | 640 | .2453 | 0.280 |
| Triethylphosphate | 15 | 0.015 | 190 | 400 | 680 | .2278 | 0.234 |
| Do | 15 | 0.031 | 190 | 480 | 760 | .2341 | 0.250 |
| Diphenylzinc | 30 | 0.015 | 280 | 790 | 700 | .2441 | 0.278 |
| Do | 30 | 0.031 | 320 | 800 | 700 | .2415 | 0.270 |
| Triphenyltin chloride | 50 | 0.015 | 330 | 780 | 680 | .2576 | 0.320 |
| Do | 50 | 0.031 | 440 | 700 | 480 | .2736 | 0.375 |
| Tetraphenyltin | 50 | 0.015 | 400 | 750 | 590 | .2604 | 0.330 |
| Do | 50 | 0.031 | | 350 | 270 | .2746 | 0.385 |
| Triphenylstibine | 51 | 0.015 | 360 | 860 | 630 | .2740 | 0.380 |
| Do | 51 | 0.031 | 370 | 830 | 620 | .2705 | 0.370 |
| Diethylmercury | 80 | 0.015 | 360 | 900 | 660 | .2801 | 0.403 |
| Do | 80 | 0.031 | 600 | 1,870 | 700 | .3101 | 0.545 |
| Diphenylmercury | 80 | 0.015 | 420 | 1,020 | 670 | .2668 | 0.355 |
| Do | 80 | 0.031 | 450 | 950 | 570 | .2861 | 0.425 |
| Tetraethyllead | 82 | 0.015 | 500 | 1,260 | 610 | .3051 | 0.520 |
| Do | 82 | 0.031 | 600 | 1,380 | 620 | .3180 | 0.590 |
| Tetraphenyllead | 82 | 0.015 | 590 | 1,120 | 550 | .3016 | 0.500 |
| Do | 82 | 0.031 | 680 | 1,120 | 490 | .3211 | 0.610 |

Table XII

[Dosage $3 \times 10^7$ rep (dose rate $4.56 \times 10^4$ rep/hr.)]

| Promoter | Atomic number of central atom | Gram mols promoter/ 100 grams rubber | 300% modulus (p.s.i.) | Tensile strength (p.s.i.) | Percent elongation | $V_r$ | $v \times 10^4$ (moles/cc.) |
|---|---|---|---|---|---|---|---|
| None | | | 1,210 | 2,380 | 520 | .3656 | 0.96 |
| Triphenylmethane | 6 | 0.015 | 910 | 1,430 | 460 | .3580 | 0.89 |
| Do | 6 | 0.031 | 480 | 1,200 | 660 | .3420 | 0.76 |
| Tetraethyl-o-silicate | 14 | 0.015 | 1,590 | 1,720 | 320 | .3890 | 1.20 |
| Do | 14 | 0.031 | 1,270 | 2,170 | 500 | .3785 | 1.08 |
| Triethylphosphate | 15 | 0.015 | 1,290 | 2,080 | 480 | .3859 | 1.16 |
| Do | 15 | 0.031 | 1,010 | 2,370 | 610 | .3767 | 1.06 |
| Diphenylzinc | 30 | 0.015 | 1,130 | 2,230 | 530 | .3802 | 1.10 |
| Do | 30 | 0.031 | 1,210 | 2,240 | 500 | .3858 | 1.16 |
| Triphenyltin chloride | 50 | 0.015 | 970 | 1,740 | 520 | .3980 | 1.30 |
| Do | 50 | 0.031 | 1,270 | 1,540 | 370 | .4140 | 1.52 |
| Tetraphenyltin | 50 | 0.015 | 1,210 | 1,780 | 430 | .3810 | 1.11 |
| Do | 50 | 0.031 | | 820 | 190 | .4162 | 1.55 |
| Triphenylstibine | 51 | 0.015 | 1,250 | 1,870 | 430 | .3929 | 1.25 |
| Do | 51 | 0.031 | 1,650 | 2,300 | 400 | .3940 | 1.25 |
| Diethylmercury | 80 | 0.015 | 1,850 | 2,530 | 360 | .4390 | 1.92 |
| Do | 80 | 0.031 | | 2,200 | 260 | .4582 | 2.30 |
| Diphenylmercury | 80 | 0.015 | 1,760 | 2,320 | 400 | .3911 | 1.21 |
| Do | 80 | 0.031 | 1,560 | 1,620 | 310 | .4204 | 1.60 |
| Tetraethyllead | 82 | 0.015 | | 1,790 | 230 | .4497 | 2.13 |
| Do | 82 | 0.031 | | 1,600 | 240 | .4569 | 2.25 |
| Tetraphenyllead | 82 | 0.015 | 1,980 | 2,110 | 320 | .4314 | 1.75 |
| Do | 82 | 0.031 | | 1,650 | 260 | .4425 | 1.98 |

The data of Tables X, XI, and XII demonstrate the value of the organometal promoters of my invention in the enhancement of vulcanization by radiation. Improved vulcanization effects are evident at all dosage levels with the organometal promoter wherein the metal has an atomic number of 50 and above. Direct correlation can be made between the radiation effect and the atomic number of the metal atom as was shown in the runs employing the inorganic attenuators. Enhancement at higher dosages is evident for organometals having a metal with an atomic number lower than those effective in the inorganic attenuator. In this connection, it is noted that diphenylzinc at a dosage of $3 \times 10^7$ rep had a definite effect in enhancing vulcanization. In contrast, triphenylmethane was ineffective at all dosage levels, and both tetraethyl-o-silicate and triethylphosphate, while evidencing some improvement, were inconsistent. Comparison of the data on lead tetraacetate in Table IX with tetraethyllead in Tables X–XII shows the definite advantage of the organometal in enhancing radiation effects by what is believed to be the dual action of attenuation plus free radical formation. It is significant that a majority of promoters employed did not have appreciable deleterious effects upon the physical properties of the elastomer, while, in many cases, actual improvements resulted.

EXAMPLE VIII

High abrasion furnace black (Philblack O) was blended on the mill with a 75/25 butadiene/styrene rubber prepared by emulsion polymerization at 41° F. and having a Mooney value (ML–4) of 52±6. Lead oxide (commercial litharge) as received was incorporated into one batch, lead oxide which had been ball milled one week was used in a second batch, and lead oxide which had been ball milled two weeks was used in a third batch. The recipe for each batch was as follows:

|  | Parts by weight |
|---|---|
| Butadiene/styrene rubber | 100 |
| Carbon black | 50 |
| Lead oxide | 20 |

Average values of the approximate surface area of the lead oxide were obtained and with the calculated particle diameters are as follows:

| Lead oxide (litharge) | Area average particle diameter, micron | Surface area [1] |
|---|---|---|
| As received | 0.52 | 1.2 |
| Ball milled 1 week | 0.37 | 1.7 |
| Ball milled 2 weeks | 0.30 | 2.0 |

[1] Square meters per gram.

The samples were sheeted off the mill and test specimens were prepared and irradiated using the method described in Example I. The samples were irradiated using six different dose rates but there were only slight variations in the total dosage. Each can contained samples prepared from lead oxide as received and lead oxide which had been ball milled one and two weeks, so the results for each dose rate were obtained on samples treated identically.

Following removal of the samples from the gamma ray field, the degree of vulcanization was determined. It is expressed in terms of density of network chains. Results were as follows:

Table XIII

| Dose rate rep per hour | Total dosage rep | Lead oxide, $v \times 10^4$ moles per cc. | | |
|---|---|---|---|---|
| | | As received | Ball milled 1 week | Ball milled 2 weeks |
| $1.26 \times 10^5$ | $3.22 \times 10^7$ | 1.74 | 1.70 | 2.1 |
| $1.01 \times 10^4$ | $3.22 \times 10^7$ | 1.80 | 1.90 | 2.12 |
| $2.43 \times 10^4$ | $2.88 \times 10^7$ | 1.68 | 1.93 | 2.10 |
| $5.01 \times 10^4$ | $3.00 \times 10^7$ | 1.63 | 1.77 | 1.93 |
| $6.99 \times 10^4$ | $2.91 \times 10^7$ | 1.53 | 1.61 | 1.76 |
| $9.48 \times 10^4$ | $2.91 \times 10^7$ | 1.43 | 1.50 | 1.73 |

The data of the above table shows a remarkable increase in attenuator effectiveness by finely dividing the metal or metal compound prior to blending with the polymer. The advantages of my invention can be improved, therefore, with this additional processing step.

EXAMPLE IX

High abrasion furnace black (Philblack O) was blended with three types of butadiene-styrene rubber prepared by emulsion polymerization at 41° F. Lead oxide was incorporated into one batch of each of the three rubber blends and the samples were prepared and irradiated according to the method described in Example I. Following irradiation, the physical properties of samples with and without lead oxide were determined and are shown in Table XIV.

Table XIV

| Rubber | Total dosage, rep | PbO [a] | Modulus, p.s.i. | Tensile strength, p.s.i. | Ultimate elongation, percent | Resilience, percent |
|---|---|---|---|---|---|---|
| Butadiene/styrene (75/25) | $3 \times 10^7$ | | 1,350 | 2,850 | 580 | 58.6 |
| | $3 \times 10^7$ | 2 | 2,460 | 2,890 | 350 | 64.4 |
| Butadiene/styrene, oil extender [b] | $5 \times 10^7$ | | 700 | 1,560 | 650 | 60.8 |
| | $3 \times 10^7$ | 2 | 810 | 1,770 | 610 | 59.4 |
| Butadiene/styrene (50/50) | $3 \times 10^7$ | | 750 | 2,270 | 810 | 53.6 |
| | $3 \times 10^7$ | 2 | 1,710 | 2,540 | 460 | 57.0 |

[a] Parts by volume per 100 volumes of rubber.
[b] Contains from 22.5 to 24.5 weight percent bound styrene and 37.5 parts of highly aromatic extender oil. Mooney value (ML-4) approximately 55.

As shown above, lead oxide is a very desirable attenuator as it does not impair the desirable mechanical properties of the finished vulcanizate. In all cases, the changes in properties on addition of lead oxide are in the direction of increased cross-linking, or a lower radiation dosage is required to produce vulcanizates of equivalent properties.

EXAMPLE X

A butadiene/styrene rubber (75/25) reinforced with high abrasion black as in the previous examples was blended with lead oxide and lead peroxide in separate runs and the compositions irradiated as previously described. Results of these runs are shown in Table XV.

Table XV

| Rubber | Promoter (8.5 mole percent) [a] | $\nu \times 10^4$ (moles/cc.) [b] at the indicated dosages | | |
|---|---|---|---|---|
| | | $1 \times 10^7$r | $3 \times 10^7$r | $7 \times 10^7$r |
| Butadiene/styrene | | 0.42 | 1.22 | 3.00 |
| | PbO | 0.93 | 2.48 | 3.40 |
| | PbO$_2$ | 1.70 | 3.40 | 8.10 |

[a] Based on rubber.
[b] Number of network chains; swelled in n-heptane.

As seen from the data of Table XV, the lead peroxide is a more potent promoter of vulcanization than lead oxide even though the absorption of the two materials is essentially the same. Such a phenomenon is consistent with the stability of these compounds.

EXAMPLE XI

A thin filament of pure gum rubber (75/25 butadiene/styrene) was irradiated between plates of various metals, adjusted in thickness to transmit equal intensities of irradiation. The raw rubber was the same thickness (0.010 inch) for all assemblies. The sandwich-like specimens were then placed along the walls of aluminum cans and irradiated in nitrogen at the Materials Testing Reactor as described in the previous examples to a dosage of $3 \times 10^7$ rep. The degree of cross-linking of each rubber specimen is shown in Table XVI.

Table XVI

| Metal | None | Al | Ni | Mo | Sn | W | Pb |
|---|---|---|---|---|---|---|---|
| Atomic number | | 13 | 28 | 42 | 50 | 74 | 82 |
| $\nu \times 10^4$, moles/cc. | 0.66 | 0.72 | 0.86 | 0.87 | 0.89 | 1.73 | 1.88 |

The data of Table XVI shows that the number of network changes induced in the rubber by gamma radiation increases with the atomic number of the metal in contact with the rubber. It should be noted that the control actually received more of the incident gamma radiation than the other members of the series. In spite of this disadvantage, the lead-clad rubber specimen had three times as many cross-links as the control.

EXAMPLE XII

A butadiene/styrene rubber was prepared by emulsion polymerization at 41° F. to give a polymer having a raw Mooney value (ML-4) of 52 and a bound styrene content of 20 percent. A typical recipe for the production of a polymer of this type is as follows:

| | Parts by weight |
|---|---|
| Butadiene | 75 |
| Styrene | 25 |
| Water | 180 |
| Rosin soap, K salt | 4.5 |
| Tamol N [1] | 0.15 |
| Na$_3$PO$_4 \cdot$ 12H$_2$O | 0.80 |
| p-Menthane hydroperoxide | 0.12 |
| FeSO$_4 \cdot$ 7H$_2$O | 0.20 |
| K$_4$P$_2$O$_7$ | 0.30 |
| tert-Dodecyl mercaptan | (2) |

[1] Sodium salt of a naphthalene sulfonic acid condensed with formaldehyde.
[2] As required for a 52 ML-4 rubber.

High abrasion furnace black (Philblack O) was blended on the mill with the butadiene/styrene rubber using 50 parts by weight of black per 100 parts of rubber. One stock was reserved as a control while a metal stearate or palmitate was incorporated into each of the others. Each metal salt was employed in an amount such that 0.03 gram atom of metal was present per 100 grams of rubber. The samples were sheeted off the mill and pressed in a hydraulic press between sheets of Holland cloth to give sheets having a thickness of approximately 60 mils. Test specimens were cut from the resulting sheets and packed into aluminum cans which were evacuated and pressured with helium three times and then irradiated in a field of gamma rays from spent fuel elements from the Materials Testing Reactor at Arco, Idaho, at a canal temperature of approximately 75° F. A pressure of 10 pounds of helium was maintained in the cans during irradiation. Some samples received a total nominal dosage of 1×10⁷ rep, others 3×10⁷ rep, and still others 7×10⁷ rep. Following removal of the samples from the gamma ray field, the degree of vulcanization was determined from a comparison of the percent extractable materials and the grams solvent per gram of extracted rubber. The latter value is determined by weighing a sample of rubber, extracting it with an excess of n-heptane, weighing the sample in the swollen state, and then drying it and weighing it again. A sample which is highly cross-linked will be swollen to a much less extent and contain less solvent than one which is cross-linked to a lesser degree. In addition to studying the effect of irradiation upon cross-linking, physical properties were also determined. Results were as follows:

I claim:
1. A method of crosslinking polymeric stock of olefinic polymer which crosslinks on exposure to high energy radiation which comprises forming a mixture of said polymeric stock and a material selected from the group consisting of a source of metal atoms having an atomic number of at least 40, organometal wherein the metal has an atomic number of 30 to 39, and metal salts of aliphatic acids containing at least 8 carbon atoms per molecule wherein the metal has an atomic number less than 40, and exposing said mixture in the uncured state to neutron-free high energy electromagnetic radiation having a potential at least equivalent to the X ray at a rate in the range of about $10^3$ to $3 \times 10^7$ rep per hour for a

Table XVII

| | None | Type of promoter | | | | | | | |
|---|---|---|---|---|---|---|---|---|---|
| | | Li stearate | Mg stearate | Ca stearate | Zn stearate | Cd stearate | Ba stearate | Pb stearate | Zn palmitate |
| Atomic number of metal atom | | 3 | 12 | 20 | 30 | 48 | 56 | 82 | 30 |
| Amount of promoter used, phr.[1] | | 9.3 | 18.8 | 19.2 | 20.1 | 21.4 | 22.3 | 25.0 | 18.3 |
| Weight percent metal in promoter | | 2.4 | [2] 4.0 | [2] 6.6 | [2] 10.3 | [2] 16.6 | [2] 19.5 | [2] 28.5 | [2] 11.4 |
| Gram atoms metal/100 g. rubber | | 0.0319 | 0.0309 | 0.0316 | 0.0316 | 0.0316 | 0.0316 | 0.0343 | 0.0319 |
| Nominal radiation dosage: | | | | | | | | | |
| 1×10⁷ reps: | | | | | | | | | |
| Extractables, percent | 13.27 | 11.97 | 10.60 | 9.67 | 10.30 | 9.78 | 9.41 | 9.04 | 10.43 |
| Grams solvent/g. extracted rubber | 1.19 | 1.13 | 0.98 | 0.96 | 0.99 | 0.94 | 0.90 | 0.89 | 0.97 |
| 300% modulus, p.s.i. | 440 | 510 | 510 | 440 | 540 | 570 | 540 | 630 | 410 |
| Tensile, p.s.i. | 1,280 | 1,550 | 1,130 | 1,340 | 1,320 | 1,560 | 1,620 | 1,710 | 1,470 |
| Elongation, percent | 720 | 810 | 680 | 810 | 660 | 670 | 720 | 680 | 840 |
| 3×10⁷ reps: | | | | | | | | | |
| Extractables, percent | 6.60 | 5.65 | 6.17 | 5.08 | 5.66 | 4.89 | 4.93 | 4.38 | 5.07 |
| Grams solvent/g. extracted rubber | 0.68 | 0.63 | 0.63 | 0.58 | 0.60 | 0.57 | 0.55 | 0.56 | 0.56 |
| 300% modulus, p.s.i. | 2,150 | 2,280 | 1,900 | 1,990 | 2,020 | 2,290 | 2,320 | | 1,940 |
| Tensile, p.s.i. | 2,970 | 3,100 | 1,930 | 2,960 | 2,890 | 2,670 | 2,610 | 2,580 | 2,900 |
| Elongation, percent | 410 | 400 | 310 | 420 | 410 | 340 | 340 | 270 | 430 |
| 7×10⁷ reps: | | | | | | | | | |
| Extractables, percent | 4.24 | 4.05 | 4.16 | 3.70 | 3.96 | 3.61 | 3.30 | 2.71 | 3.82 |
| Grams solvent/g. extracted rubber | 0.47 | 0.47 | 0.41 | 0.43 | 0.41 | 0.44 | 0.37 | 0.36 | 0.44 |
| Tensile, p.s.i. | 2,860 | 2,660 | 1,810 | 2,590 | 2,620 | 2,040 | 1,960 | 2,060 | 2,490 |
| Elongation, percent | 240 | 210 | 160 | 180 | 200 | 150 | 160 | 120 | 210 |

[1] Parts by weight per 100 parts rubber. [2] Based on manufacturer's analysis.

It is possible to note the promotional effect of the aliphatic acid salts by observing simultaneously the percent extractables and the imbibition of solvent by the cross-linked rubber. Such a characterization depends on the fact that as the rubber becomes cross-linked, the extractables and solvent imbibition decrease. The data of Table XVII indicate that significant promotion of cross-linking of cold rubber in a gamma ray field is obtainable with metal stearates even when the atomic number is less than 20.

Density of network chains as determined for the examples of this specification is a quite reliable indication of the degree of cross-linking in these polymers. The technique is that described by Flory in Principles of Polymer Chemistry, Cornell University Press, Ithaca, New York (1953), pages 576–580. An adaptation of an equation from that work was used as follows:

$$\nu = \frac{-1}{V_s} \frac{\ln(1-V_r) + V_r + \mu V_r^2}{V_r^{1/3} - V_r/2}$$

$\nu$ = moles of network chains per cubic centimeter
$V_r$ = volume of rubber in swollen gel
$\mu$ = solubility parameter expressing first neighbor interaction free energy, divided by $kT$, for solvent with polymer
$V_s$ = molar volume of swelling media As will be evident to those skilled in the art, various modifications of this invention can be made, or followed, in the light of this foregoing disclosure and discussion, without departing from the spirit or scope thereof.

total dosage of about $10^5$ to $5 \times 10^8$ rep, said material being present in sufficient amount to attenuate said radiation.

2. The method of claim 1 wherein said material is a source of metal atoms having an atomic number of at least 40.

3. The method of claim 1 wherein said material is an organometal in which the metal has an atomic number of 30 to 39.

4. The method of claim 1 wherein said material is a metal salt of an aliphatic acid containing at least 8 carbon atoms per molecule in which the metal has an atomic number less than 40.

5. The method of claim 1 wherein said polymeric stock is a synthetic, elastomeric, predominantly conjugated diene polymer.

6. The method of claim 1 wherein said polymeric stock is natural ruuber.

7. A method of effecting cross-linking in elastomeric materials such as natural and synthetic rubbers which comprises forming a mixture of an elastomeric material selected from the group consisting of natural rubber, homopolymers of conjugated dienes having from 4 to 8 carbon atoms per molecule, and copolymers having a major amount of conjugated diene and a minor amount of copolymerizable monomer containing the $CH_2=C<$ group, said elastomeric material having the property of becoming cross-linked when exposed to high energy radiation, with a source of metal atoms having an atomic number of at least 40, in an amount in the range of about 0.015 to 0.5 gram atom of the metal per 100 grams of elastomer; and exposing said mixture in the uncured state to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

8. A method of vulcanizing a butadiene-styrene copolymer which comprises forming a mixture of butadiene-styrene copolymer with a source of metal atoms having an atomic number of at least 40, said metal being present in an amount in the range of about 0.015 to 0.5 gram atom of said metal per 100 grams of copolymer; and exposing said mixture in the uncured state to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

9. The method of claim 8 wherein said metal is lead.

10. The method of claim 8 wherein said metal is barium.

11. The method of claim 8 wherein said metal in cadmium.

12. The method of claim 8 wherein said metal is mercury.

13. The method of claim 8 wherein said metal is molybdenum.

14. The method of claim 8 wherein said metal is zirconium.

15. The method of claim 8 wherein said metal is tantalum.

16. The method of claim 8 wherein said metal is tungsten.

17. The method of claim 8 wherein said metal is uranium.

18. The method of claim 8 wherein said metal is tin.

19. The method of claim 8 wherein said metal is antimony.

20. A method of vulcanizing a butadiene-styrene copolymer which comprises forming a mixture of butadiene-styrene copolymer with from 0.015 to 0.5 gram mol of lead oxide per 100 grams of copolymer and exposing said mixture in the uncured state to neutron-free gamma radiation at a rate in the range of about $10^3$ to $3 \times 10^7$ rep per hour for a total dosage of about $10^5$ to $5 \times 10^8$ rep.

21. A method of effecting cross-linking in elastomeric materials such as nutural and synthetic rubbers which comprises forming a mixture of an elastomeric material selected from the group consisting of natural rubber, homopolymers of conjugated dienes having from 4 to 8 carbon atoms per molecule, and copolymers having a major amount of conjugated diene and a minor amount of copolymerizable monomer containing the $CH_2=C<$ group, said elastomeric material having the property of becoming cross-linked when exposed to high energy radiation, with an organometal in which the metal has an atomic number of at least 40 and each organic radical has not more than 12 carbon atoms, in an amount in the range of about 0.005 gram mole to 0.1 gram mol of organometal per 100 grams of elastomer; and exposing said mixture in the uncured state to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

22. A method of vulcanizing a butadiene-styrene copolymer which comprises forming a mixture of butadiene-styrene copolymer with an organometal having not more than 12 carbon atoms per organic radical and in which the metal has an atomic number of at least 30, in an amount of about 0.005 gram mole to 0.1 gram mole per 100 grams of copolymer; and exposing said mixture in the uncured state to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

23. The method of claim 21 wherein said organometal has the formula $R_nMeX_m$ where Me is a metal having an atomic number of at least 40, each R is an organic radical selected from the group consisting of alkyl, aryl, aralkyl, cycloalkyl, and alkaryl, each X is a halogen, $n$ is an integer not less than 1 and the sum of $n+m$ is equal to the valence of the metal.

24. The method of claim 21 wherein said organometal is tetraethyllead.

25. The method of claim 21 wherein said organometal is tetraphenyllead.

26. The method of claim 21 wherein said organometal is diphenylmercury.

27. A method of effecting cross-linking in elastomeric materials such as natural and synthetic rubbers which comprises forming a mixture of an elastomeric material selected from the group consisting of natural rubber, homopolymers of conjugated dienes having from 4 to 8 carbon atoms per molecule, and copolymers having a major amount of conjugated diene and a minor amount of copolymerizable monomer containing the $CH_2=C<$ group, said elastomeric material having the property of becoming cross-linked when exposed to high energy radiation, with a metal salt of an aliphatic acid containing from 12 to 30, inclusive, carbon atoms per molecule, in an amount in the range of about 0.01 to 0.1 gram mol per 100 grams of elastomeric material; and exposing said mixture in the uncured state to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

28. A method of vulcanizing a butadiene-styrene copolymer which comprises forming a mixture of butadiene-styrene copolymer with from about 0.01 to 0.1 gram mol of a metal salt of stearic acid per 100 grams of copolymer, and exposing said mixture in the uncured state to neutron-free gamma radiation at a rate in the range of about $10^3$ to $3 \times 10^7$ rep per hour for a total dosage of about $10^5$ to $5 \times 10^8$ rep.

29. The method of claim 28 wherein said metal is calcium.

30. A method of increasing the crosslinking effect of high energy electromagnetic radiation such as gamma rays or X rays on long chain polymers which comprises encasing a sheet of uncured polymeric material of the type selected from the group consisting of synthetic long chain polymers and natural long chain polymers, said polymer becoming crosslinked on exposure to high energy radiation, between thin plates of heavy metal having an atomic number of at least 40 in a form selected from the group consisting of free metal and alloy, the surfaces of said sheet of polymeric material and said plates being in firm contact, and subjecting the assembly to neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep.

31. A method of continuously cross-linking uncured polymer in an elongated structure, said polymer becoming crosslinked on exposure to high energy radiation which comprises passing said structure through a zone of neutron-free high energy electromagnetic radiation having a potential at least equivalent to the X ray at a rate in the range of about $10^3$ to $3 \times 10^7$ rep per hour for a total dosage of about $10^5$ to $5 \times 10^8$ rep and interposing between said structure and the radiation source a thin metallic shield in close contact with said structure, said shield containing at least 50 weight percent metal atoms having an atomic number of at least 40, said metal atoms attenuating said radiation and serving to enhance the effect of said radiation on said polymer.

32. The method of claim 30 wherein said elongated structure is formed continuously by extrusion of molten polymer through a die and then passed through said zone of radiation.

33. The method of claim 30 wherein said elongated structure is formed by continuously pressing softened polymer between metallic surfaces which also serve as said shield.

References Cited in the file of this patent

UNITED STATES PATENTS

| | | |
|---|---|---|
| 2,628,386 | Tornberg | Feb. 17, 1953 |
| 2,651,077 | Justus | Sept. 8, 1953 |
| 2,719,324 | Gray et al. | Oct. 4, 1955 |
| 2,748,009 | Bruner et al. | May 29, 1956 |
| 2,763,609 | Lewis et al. | Sept. 18, 1956 |
| 2,813,301 | Underwood | Nov. 19, 1957 |
| 2,830,946 | Mackenzie | Apr. 15, 1958 |
| 2,863,812 | Graham | Dec. 9, 1958 |
| 2,940,951 | Ruskin | June 14, 1960 |
| 2,948,666 | Lawton | Aug. 9, 1960 |

FOREIGN PATENTS

| | | |
|---|---|---|
| 665,262 | Great Britain | Jan. 23, 1952 |
| 714,843 | Great Britain | Sept. 1, 1954 |

OTHER REFERENCES

Bopp et al.: Radiation Stability of Plastics and Elastomers, ORNL-1373, July 23, 1953, pages 14, 15, 21 and 22.

Science News Letter, volume 67 (Feb. 12, 1955), page 101.